Aug. 4, 1959

J. T. GONDEK 2,897,662

SHAFT COUPLINGS

Filed Nov. 5, 1956

INVENTOR
John T. Gondek

BY *[signature]*

ATTORNEY

Aug. 4, 1959
J. T. GONDEK
2,897,662
SHAFT COUPLINGS
Filed Nov. 5, 1956
2 Sheets-Sheet 2
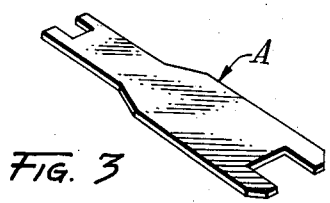
Fig. 3
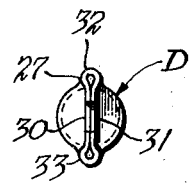
Fig. 5
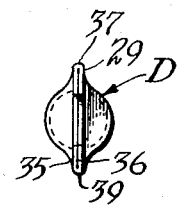
Fig. 6
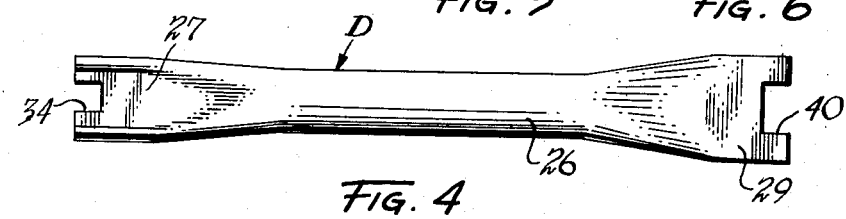
Fig. 4
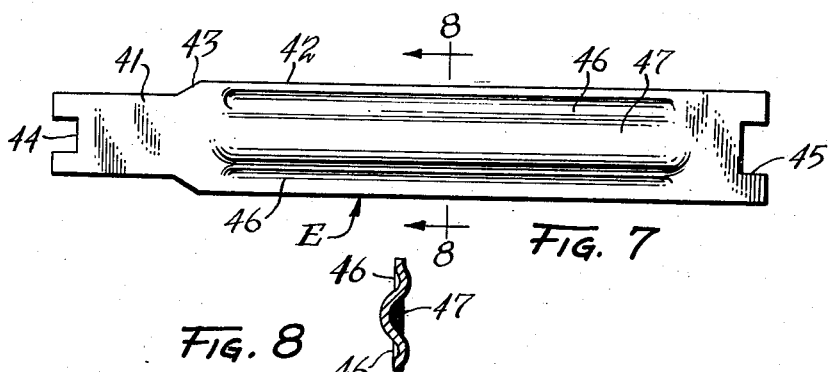
Fig. 7
Fig. 8
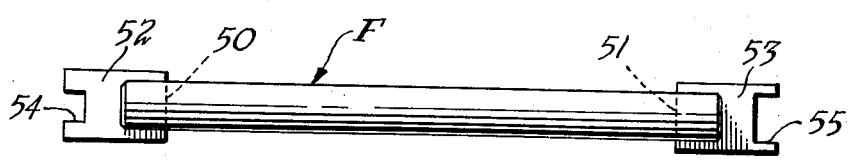
Fig. 9
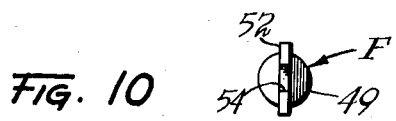
Fig. 10
INVENTOR
John T. Gondek
BY
ATTORNEY United States Patent Office 2,897,662
Patented Aug. 4, 1959

2,897,662

SHAFT COUPLINGS

John T. Gondek, Minneapolis, Minn.

Application November 5, 1956, Serial No. 620,320

8 Claims. (Cl. 64—15)

This invention relates to an improvement in shaft coupling and deals particularly with a means of communicating a rotative force from a drive member to a driven member.

Various types of shaft couplings have been produced for connecting a pair of rotatable shafts or the like. Some of these couplings include spring elements to cushion the effect of the transmitted power and to permit a smoother flow of power between the two members. Most such couplings are relatively expensive to manufacture and sell. An object of the present invention resides in the provision of a shaft coupling which will accomplish the desired results and yet which may be produced at an extremely low cost.

An object of the present invention resides in the provision of a shaft coupling which may be quickly and easily attached and as easily removed. In general, it comprises a member having flat ends which are axially notched. In preferred form, the notch at each end of the elongated coupler is of proper width to accommodate an end of each shaft to be coupled. The shafts are also notched through a diameter thereof and at the end of each of the shafts to be coupled. The coupler extends into the notches in the ends of the shafts thus holding the two shafts from relative rotation. The portions of the coupler on either side of the notches therein overlie portions of the shafts to prevent the coupler from moving in a radial direction relative to the shafts. When properly arranged, the coupler will remain in position until one of the shafts is moved in an axial direction away from the other a distance sufficient to disengage the notches.

A feature of the present invention resides in the fact that in fastening the coupler it is only necessary to engage one end of the coupler with one of the shafts to be connected, move the other shaft axially into engagement with the other end of the coupler, and to secure the shaft from axial movement. As a result the coupling is automatically disengaged when the shafts are separated.

A further feature of the present invention resides in the fact that the coupler may be constructed to provide a desired flexibility depending upon the purpose for which it is intended. In its simplest form, it comprises merely a strip of spring metal stamped or cut to shape and notched at each end. By properly regulating the flexibility of the spring metal, or by varying the length of the coupler, the resiliency of the connection may be regulated.

A further feature of the present invention resides in the fact that if it is desired, the coupler may have a tubular center portion and flat end portions. With this arrangement, the mounting and attachment of the coupler is identical to that previously described. However, the angular deflection between the ends of the coupler may be greatly reduced as the tubular or cylindrical center portion will not twist to the same extent as the flat coupler above described.

A further feature of the present invention resides in the fact that the coupler may also be varied in flexibility and tendency to whip between its ends by stamping the flat coupler to provide longitudinally extending ribs. Ribs of this type change the flexibility of the coupler and thus a coupler of this type may be employed when different conditions are experienced.

These and other objects and novel features of the present invention will be more clearly and fully set forth in the following specification and claims.

In the drawings forming a part of the specification:

Figure 3 is a perspective view showing the coupler in its simplest form.

Figure 4 is an elevation view of a modified form of coupler.

Figure 5 is an end view of one end of the coupler shown in Figure 4.

Figure 6 is an end view of the other end of the coupler shown in Figure 4.

Figure 7 is an elevation view of a modified form of coupler.

Figure 8 is a sectional view through the coupler shown in Figure 7, the position of the section being indicated by the line 8—8 of Figure 7.

Figure 9 is an elevation view of another modified form of coupler construction.

Figure 10 is an end view of the coupler shown in Figure 9.

Figure 1:
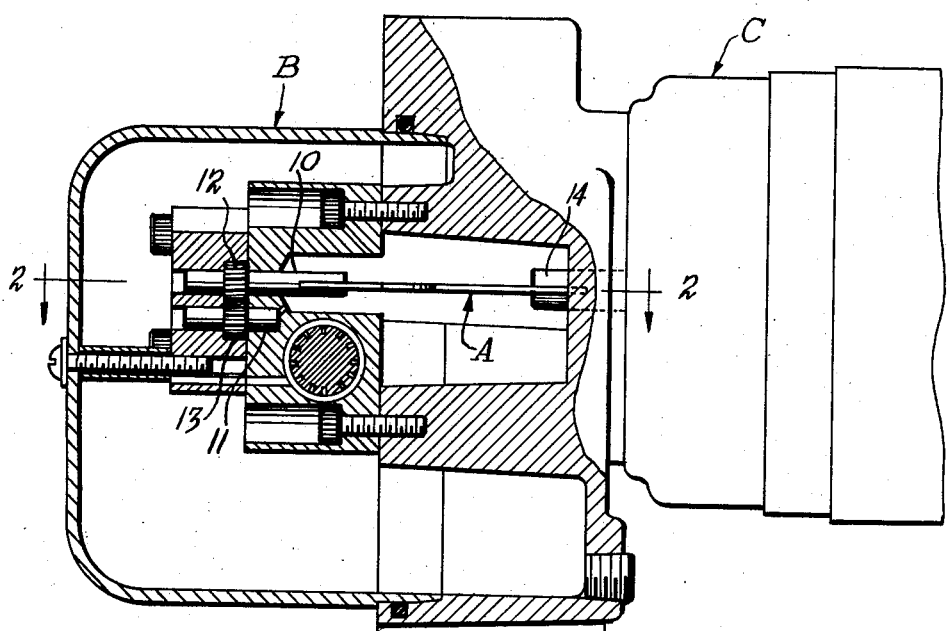
Figure 1 is a side elevational view, partly in section, showing a pump incorporating a coupler of the type in question.
Figure 2:
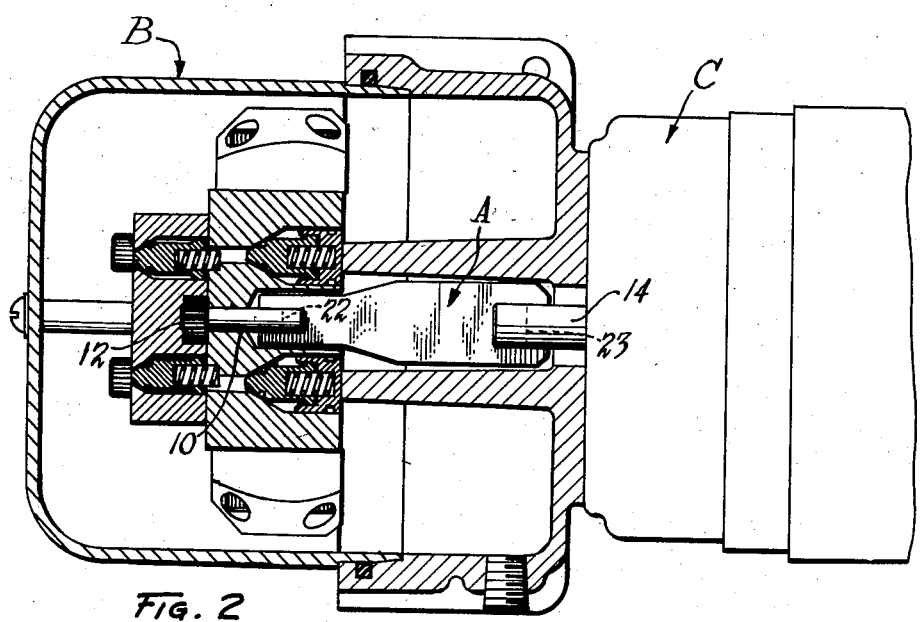
Figure 2 is a sectional view through a portion of the pump illustrated in Figure 1, the position of the section being indicated by the line 2—2 of Figure 1.

Figures 1 and 2 of the drawings show a coupler A as embodied in a pump B. The pump B includes a pair of parallel shafts 10 and 11 bearing gears 12 and 13 which are in mesh and which form the gear pump. The pump B is driven by a motor C which is attached thereto and which is provided with a motor shaft 14 which may be the armature shaft or may be a shaft driven by the motor. In the particular embodiment illustrated, the shaft 14 comprises the armature shaft.

The coupler A is formed as is best illustrated in Figure 3 of the drawings. This coupler comprises an elongated body of spring metal and in the particular arrangement illustrated the strip or coupler body 15 is provided with a relatively wide end 16 and a relatively narrower end 17 connected by a tapered intermediate portion 19. The reason for this particular form lies in the fact that the pump shaft 10 is of smaller diameter than the motor shaft 14 and the coupler is shaped to provide adequate strength at both ends without requiring excessive space for rotation.

A notch 20 extends into the wider end 16 of the coupler in an axial direction, the notch being centered between the longitudinal side edges of the coupler. The width of the notch 20 is approximately equal to the diameter of the shaft 14 to which it is to be secured. A similar notch 21 is provided in the narrower end 17 of the coupler, this notch being of a width substantially equal to the diameter of the pump shaft 10. As a result, a portion of the shaft 14 may be embraced in the notch 20 while a portion of the shaft 10 may be embraced in the notch 21.

As indicated in Figures 1 and 2 of the drawings the shaft 10 is notched as indicated at 22, the notch extending diametrically through the axis of the shaft 10 and being of a width substantially equal to the thickness of the coupler body 15. The end of the shaft 14 is similarly notched as indicated at 23 and the width of this notch is substantially equal to the thickness of the coupler body 15. As a result of this arrangement, a portion of each end of the coupler at the base of the notches 20 or 21 is engaged in a corresponding slot or notch 22 or 23. This engagement of the body of the coupler in the slots or notches 22 and 23 connects the two shafts for rotation in unison.

The portions of the coupler at one end thereof which are on opposite sides of the notch 20 provide shoulders 24 which overlie portions of the periphery of the shaft 14 beyond the base of the notch 23 to hold this end of the coupler from lateral or radial movement. In a similar manner, the portions of the coupler on opposite sides of the notch 21 form shoulders 25 which are designed to engage on opposite sides of the shaft 10 beyond the base of the notch 22 to form a means of holding the coupler from lateral or radial movement relative to the axis of the two shafts.

The flexibility between the ends of the coupler A may be determined from the material of which the coupler is formed and by the length of the coupler. Obviously, the longer the coupler is made the more may be the relative angularity between the two shafts. Because of the fact that the coupler is flexible to some extent, the sudden starting of the motor C will produce a somewhat less sudden starting of the pump gears thereby absorbing or dampening some of the strain upon the pump.

In Figures 4, 5 and 6 of the drawings I disclose a modified form of coupler which is indicated in general by the letter D. The coupler D is designed for the same purpose as the coupler A and may be interchanged therewith. For the purpose of uniformity, the coupler D is also shown as designed to connect shafts of different sizes although obviously the two shafts may be of the same size without changing the operation.

The coupler D includes a tubular cylindrical body 26 which is flattened to provide substantially flat end portions 27 and 29. As is indicated in Figure 5 of the drawings, the end 27 if formed by flattening opposite sides of the tube to provide parallel portions 30 and 31 which are in substantial surface contact. In view of the fact that the tubular body 26 is of constant diameter throughout its length, it is only essential that the center portions of the end 21 be flattened as indicated at 30 and 31, these parallel portions being connected by loops 32 and 33. An axially extending notch 34 is provided in the end 27, this notch 34 being of substantially equal width to the diameter of the pump shaft 10.

As is best indicated in Figure 6 of the drawings, the end 29 of the coupler is completely flattened to provide parallel portions 35 and 36 which are connected by folds 37 and 39. A notch 40 is provided in the end 29 of the coupler, the width of this notch being substantially equal to the diameter of the motor shaft 14.

It will be seen that the coupler D may be substituted for the coupler A and will serve to transmit power from one shaft to the other. It is also believed obvious that the tubular body 26 resists torsion to a greater extent than the flat coupler A and accordingly for a given torque there will be less angularity between the ends 27 and 29 than there will be between the ends of the coupler A.

In Figures 7 and 8 of the drawings, another modified form of coupler is shown, this coupler being possibly less expensive than the coupler D but somewhat more expensive than the coupler A. The coupler shown in Figures 7 and 8 and which is indicated in general by the letter E is provided with a relatively narrow end 41 and a wider portion 42 which extends the major portion of the length of the coupler and which is connected to the narrower end 41 by a tapering portion 43. Notches 44 and 45 of the type previously described are formed in the small end and in the larger end, respectively, of the coupler.

The elongated central portion of the coupler E includes a pair of elongated pockets 46 which are actually recesses on one surface of the coupler and ridges on the opposite surface. An intermediate pocket 47 is provided between the pockets 46 and in the opposite surface thereof. Accordingly, in cross section, the center portion of the coupler provides a corrugated effect which stiffens the coupler between its ends and changes the force required to twist the coupler. As the coupler E may be formed in a single stamping operation, it may be produced for approximately the same cost as the coupler A previously described.

In Figures 9 and 10 of the drawings, another form of construction is illustrated, this coupler being indicated in general by the letter F. The coupler F comprises an elongated cylindrical rod 49 which is slotted at opposite ends as indicated at 50 and 51, these slots extending through the axis of the rod 49 and on planes extending through diameters of the rod. Generally rectangular plates 52 and 53 are mounted in the slots 50 and 51, respectively, to form projections from the ends of the rod 49 which are centered with respect to the axis of the rod 49.

Notches 54 and 55 are provided in the ends of the plates 52 and 53. These notches 54 and 55 are designed to accommodate the ends of the shafts 10 and 14 so that the coupler F may be substituted for the coupler A previously described. The plates 52 and 53 are preferably anchored in a suitable manner to the rod 49 to prevent disassembly of the coupler when it is not in use.

While I have shown several modifications of my coupler, all of these constructions have certain features in common and the purpose of the various forms of construction is to change the flexibility between the ends of the coupler. All of the couplers will function as effectively for their desired purpose, it being understood that a different modified form of construction might better serve in one condition than another form thereof.

In accordance with the patent statutes I have described the principles of construction and operation of my coupler, and while I have endeavored to set forth the best embodiments thereof, I desire to have it understood that obvious changes may be made within the scope of the following claims without departing from the spirit of my invention.

I claim:

1. A coupler for connecting a pair of aligned shafts having opposed ends provided with diametrically extending slots, the connector comprising an elongated member having similar flattened ends designed to extend into said slots, said flattened ends including axially extending notches of a width substantially equal to the diameter of the shafts.

2. A shaft coupling for use in combination with a pair of shafts, the shafts having slotted ends, the slots extending into the shafts on diametrical planes through the axis of the shafts, the coupler including an elongated body having substantially flat end portions, notches extending axially into said flat end portions, the notches being substantially equal in width to the diameter of the corresponding shaft engaged and the slots in said shafts being substantially equal in width to the thickness of the flattened ends.

3. The construction described in claim 2 and in which the elongated body of the coupler is substantially equal in thickness to the thickness of said flat ends.

4. The construction described in claim 2 and in which the body of said coupler is cylindrical intermediate said flat ends.

5. The construction described in claim 2 and in which said connector is tubular between said substantially flat end portions.

6. The construction described in claim 2 and in which the elongated body of the connector comprises a cylindrical rod secured to said substantially flat end portions.

7. The construction described in claim 2 and in which the elongated body of said connector includes longitudinally extending stiffening ribs.

8. A connector for use in connecting a pair of shafts, the shafts having slots in the ends thereof, said slots extending on diametrical planes through the axis of the shafts, the connector including an elongated strip of flat spring metal having notches at opposite ends thereof, said notches being centered in the ends of said strip and extending axially thereinto, the width of each notch being substantially equal to the diameter of the shaft engaged therein and the thickness of the strip being substantially equal to the width of the said slots in said shafts.

References Cited in the file of this patent

UNITED STATES PATENTS

| | | |
|---|---|---|
| 833,153 | Blakeslee | Oct. 16, 1906 |
| 839,803 | Amsler | Jan. 1, 1907 |
| 1,084,912 | Trufant | Jan. 20, 1914 |
| 1,712,219 | Knudsen | May 7, 1929 |
| 1,804,475 | Nash | May 12, 1931 |
| 2,343,079 | Pickwell | Feb. 29, 1944 |
| 2,643,528 | Hammarbach | June 30, 1953 |